US011470022B2

(12) United States Patent
Nowak-Przygodzki et al.

(10) Patent No.: US 11,470,022 B2
(45) Date of Patent: Oct. 11, 2022

(54) AUTOMATED ASSISTANTS WITH CONFERENCE CAPABILITIES

(71) Applicant: Google LLC, Mountain View, CA (US)

(72) Inventors: Marcin Nowak-Przygodzki, Bäch (CH); Jan Lamecki, Zurich (CH); Behshad Behzadi, Freienbach (CH)

(73) Assignee: GOOGLE LLC, Mountain View, CA (US)

( * ) Notice: Subject to any disclaimer, the term of this patent is extended or adjusted under 35 U.S.C. 154(b) by 108 days.

(21) Appl. No.: 16/832,637

(22) Filed: Mar. 27, 2020

(65) Prior Publication Data
US 2020/0236069 A1 Jul. 23, 2020

Related U.S. Application Data

(63) Continuation of application No. 15/833,454, filed on Dec. 6, 2017, now Pat. No. 10,645,035.
(Continued)

(51) Int. Cl.
*H04L 51/02* (2022.01)
*H04L 12/18* (2006.01)
(Continued)

(52) U.S. Cl.
CPC ......... *H04L 51/02* (2013.01); *G06Q 10/1093* (2013.01); *G10L 15/1815* (2013.01);
(Continued)

(58) Field of Classification Search
CPC . H04L 51/02; H04L 12/1822; H04L 12/1831; G06Q 10/1093; G10L 15/1815;
(Continued)

(56) References Cited

U.S. PATENT DOCUMENTS

| 7,603,413 | B1 * | 10/2009 | Herold | ............... | H04L 12/1813 |
| | | | | | 709/204 |
| 9,420,227 | B1 * | 8/2016 | Shires | ................. | G10L 15/26 |

(Continued)

FOREIGN PATENT DOCUMENTS

| CN | 102436812 | 5/2012 |
| CN | 102572372 | 7/2012 |

(Continued)

OTHER PUBLICATIONS

Tur et al., "The CALO Meeting Assistant System," in IEEE Transactions on Audio, Speech, and Language Processing, vol. 18, No. 6, pp. 1601-1611, Aug. 2010, doi: 10.1109/TASL.2009.2038810. (Year: 2010).*

(Continued)

*Primary Examiner* — Michelle M Koeth
(74) *Attorney, Agent, or Firm* — Middleton Reutlinger

(57) ABSTRACT

Techniques are described related to enabling automated assistants to enter into a "conference mode" in which they can "participate" in meetings between multiple human participants and perform various functions described herein. In various implementations, an automated assistant implemented at least in part on conference computing device(s) may be set to a conference mode in which the automated assistant performs speech-to-text processing on multiple distinct spoken utterances, provided by multiple meeting participants, without requiring explicit invocation prior to each utterance. The automated assistant may perform semantic processing on first text generated from the speech-to-text processing of one or more of the spoken utterances, and generate, based on the semantic processing, data that is pertinent to the first text. The data may be output to the participants at conference computing device(s). The auto- (Continued)

mated assistant may later determine that the meeting has concluded, and may be set to a non-conference mode.

4 Claims, 8 Drawing Sheets

Related U.S. Application Data

(60) Provisional application No. 62/580,982, filed on Nov. 2, 2017.

(51) Int. Cl.
| | |
|---|---|
| *G10L 15/18* | (2013.01) |
| *G10L 15/22* | (2006.01) |
| *G06Q 10/10* | (2012.01) |
| *H04M 3/493* | (2006.01) |
| *G10L 15/26* | (2006.01) |
| *H04M 3/527* | (2006.01) |
| *G10L 15/30* | (2013.01) |

(52) U.S. Cl.
CPC .......... *G10L 15/22* (2013.01); *H04L 12/1822* (2013.01); *H04L 12/1831* (2013.01); *H04M 3/4936* (2013.01); *H04M 3/527* (2013.01); *G10L 15/26* (2013.01); *G10L 15/30* (2013.01); *G10L 2015/223* (2013.01); *H04M 2201/40* (2013.01); *H04M 2203/5009* (2013.01); *H04M 2203/5027* (2013.01)

(58) Field of Classification Search
CPC ......... G10L 15/22; G10L 15/26; G10L 15/30; G10L 2015/223; H04M 3/4936; H04M 2201/40; H04M 2203/5009; H04M 2203/5027

See application file for complete search history.

(56) References Cited

U.S. PATENT DOCUMENTS

| | | | |
|---|---|---|---|
| 10,176,167 B2 | 1/2019 | Evermann | |
| 10,176,808 B1* | 1/2019 | Lovitt | G06F 16/60 |
| 10,339,925 B1* | 7/2019 | Rastrow | H04L 67/306 |
| 2002/0103647 A1* | 8/2002 | Houplain | H04M 3/4211 |
| | | | 704/E15.045 |
| 2004/0145652 A1 | 7/2004 | Yamauchi et al. | |
| 2013/0144603 A1 | 6/2013 | Lord et al. | |
| 2013/0275164 A1 | 10/2013 | Gruber et al. | |
| 2013/0275875 A1 | 10/2013 | Gruber et al. | |
| 2014/0082100 A1 | 3/2014 | Sammon et al. | |
| 2014/0218372 A1 | 8/2014 | Missig et al. | |
| 2014/0330562 A1 | 11/2014 | Gabara | |
| 2015/0149177 A1 | 5/2015 | Kalns et al. | |
| 2016/0294964 A1 | 10/2016 | Brune et al. | |
| 2017/0092264 A1 | 3/2017 | Hakkani-Tur et al. | |
| 2018/0091648 A1* | 3/2018 | Hughes | H04M 3/568 |
| 2018/0267774 A1 | 9/2018 | Williams et al. | |

FOREIGN PATENT DOCUMENTS

| | | |
|---|---|---|
| JP | 2017123027 | 7/2017 |
| JP | 2017537361 | 12/2017 |
| KR | 20100109499 | 10/2010 |
| KR | 20100109520 | 10/2010 |
| KR | 20140016154 | 2/2014 |
| KR | 20160135346 | 11/2016 |
| WO | 2017078792 | 5/2017 |

OTHER PUBLICATIONS

Galley et al., "Discourse Segmentation of Multi-Party Conversation" In Proceedings of the 41st Annual Meeting of the Association for Computational Linguistics, 2003, pp. 562-569, Sapporo, Japan. Association for Computational Linguistics. (Year: 2003).*

China National Intellectual Property Administration; Notification of First Office Action issue in Application No. 201880039481.3; 10 pages; dated May 20, 2020.

Korean Patent Office; Notice of Office Action issued in Application No. 10-2019-7038862; 8 pages; dated Feb. 23, 2021.

Japan Patent Office: Notice of Allowance issued for Application No. 2019-568368 dated Sep. 7, 2020.

China National Intellectual Property Administration: Notice of Grant issued for Application No. 201880039481.3 dated Sep. 3, 2020.

European Patent Office; Extended European Search report for EP19206958.1 9 pages; dated Jan. 29, 2020.

Prakken, Henry; "Formalizing Robert's Rules of Order. An Experiment in Automating Mediation of Group Decision Making"; GMD—German National Research Center for Information Technology, Germany (accessible at http://www.es.uu.nl/groups/IS/archive/henry/RobertReport.pdf last accessed Aug. 9, 2019) (Year: 1997).

European Patent Office—International Searching Authority; Notification of Transmittal of the International Search Report and the Written Opinion of PCT Serial No. PCT/US2018/058155; dated Feb. 12, 2019.

Intellectual Property India; Examination Report issued in Application No. 201927051000; 5 pages; dated Apr. 15, 2021.

European Patent Office; Communication pursuant to Article 94(3) EPC issue in application No. 19206958.1; 7 pages; dated Oct. 26, 2021.

Korean Patent Office; Notice of Allowance issued in Application No. 10-2019-7038862; 4 pages; dated Aug. 27, 2021.

Japanese Patent Office; Notice of Allowance issued for Application No. 2020-169048; 3 pages; dated Jan. 24, 2022.

Korean Patent Office; Notice of Office Action issued in Application No. KR10-2021-7038325; 6 pages; dated Feb. 28, 2022.

* cited by examiner

Fig. 3
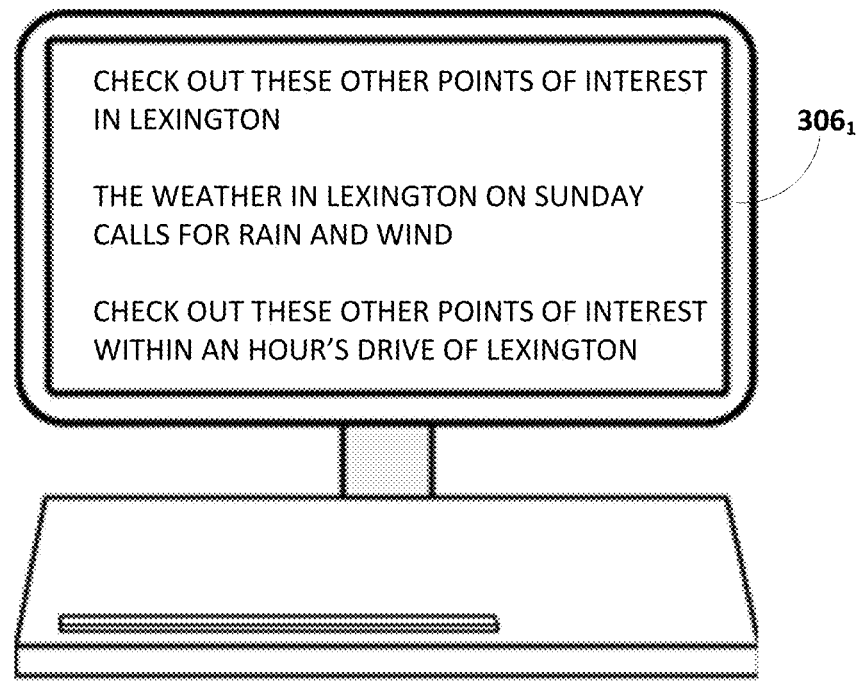
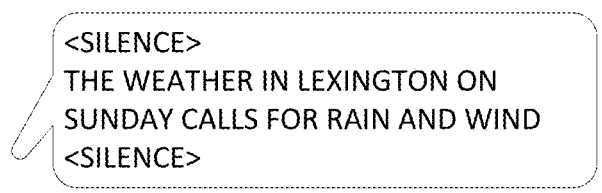
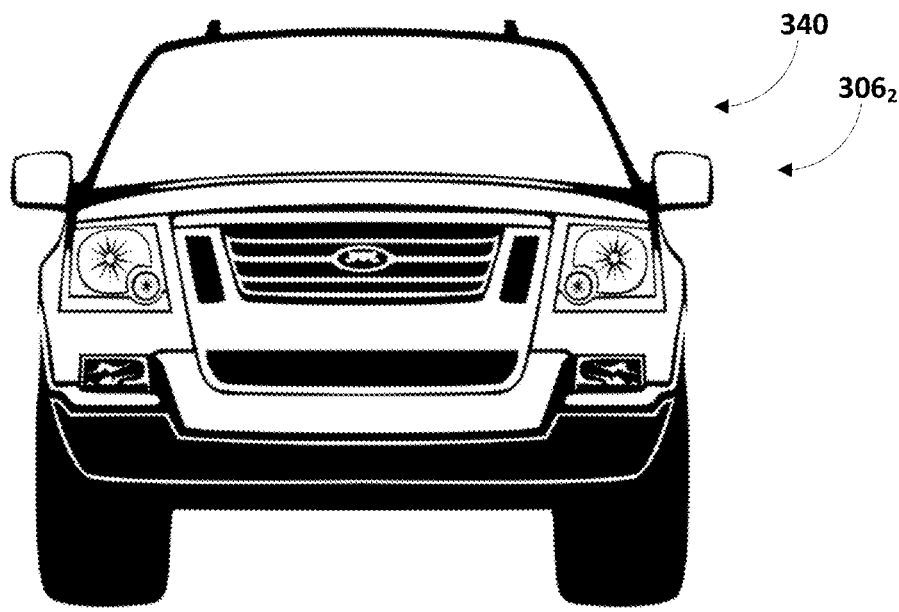

SET AN AUTOMATED ASSISTANT TO A CONFERENCE MODE IN WHICH THE AUTOMATED ASSISTANT PERFORMS SPEECH-TO-TEXT PROCESSING ON MULTIPLE DISTINCT SPOKEN UTTERANCES WITHOUT REQUIRING EXPLICIT INVOCATION OF THE AUTOMATED ASSISTANT PRIOR TO EACH OF THE MULTIPLE DISTINCT SPOKEN UTTERANCES
402

PERFORM SEMANTIC PROCESSING ON FIRST TEXT GENERATED FROM THE SPEECH-TO-TEXT PROCESSING OF ONE OR MORE OF THE MULTIPLE DISTINCT SPOKEN UTTERANCES
404

GENERATE, BASED ON THE SEMANTIC PROCESSING, DATA THAT IS PERTINENT TO THE FIRST TEXT
406

OUTPUT THE DATA TO THE MULTIPLE PARTICIPANTS AT ONE OR MORE OF THE CONFERENCE COMPUTING DEVICES WHILE THE AUTOMATED ASSISTANT IS IN CONFERENCE MODE
408

DETERMINE THAT THE MEETING HAS CONCLUDED
410

SET THE AUTOMATED ASSISTANT TO A NON-CONFERENCE MODE IN WHICH THE AUTOMATED ASSISTANT REQUIRES INVOCATION PRIOR TO PERFORMING SPEECH-TO-TEXT PROCESSING ON INDIVIDUAL SPOKEN UTTERANCES
412

GENERATE, BASED ON THE MULTIPLE DISTINCT UTTERANCES, A MEETING SUMMARY
414

AUTOMATED ASSISTANTS WITH CONFERENCE CAPABILITIES

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). For example, humans (which when they interact with automated assistants may be referred to as "users" or, in the context of a meeting, "participants") may provide commands, queries, and/or requests (collectively referred to herein as "queries") using free form natural language input which may be vocal utterances converted into text and then processed, and/or by typed free form natural language input. Automated assistants are typically invoked using predetermined vocal utterances (e.g., "OK Assistant") and often perform various types of processing, such as speech-to-text processing, natural language processing, and/or semantic processing, only on those vocal utterances that immediately follow an invocation phrase.

During a meeting involving multiple human participants there is often an active or passive participant, sometimes referred to as a "secretary," that takes notes about the meeting and shares those notes (e.g., as a summary of "action items" and/or "topics discussed") with the meeting participants. Additionally or alternatively, one or more meeting participants may take their own notes during the meeting. In either case, with notetaking it is likely that some information discussed during the meeting will be lost. Although a stenographer could be engaged to generate a full or as-full-as-possible written transcript of the meeting, stenography can be expensive and/or impractical for routine or informal meetings.

It is also common during meetings for participants to operate computing devices to augment the meeting with information. In some cases one or more participants may project or otherwise present a series of slides to guide discussion. As another example, when questions are raised ("what flights are cheapest?", "what will the weather be like when we're there?", "what seats are available?", etc.), one or more participants may manually operate a computing device such as their mobile phone to perform an Internet search seeking responsive information that they can then convey to the group. These searches may interrupt the flow of the meeting and/or cause the searching participant to miss discussion while they perform their research.

SUMMARY

Techniques are described herein for enabling automated assistants to enter into a "conference mode" in which they can "participate" in meetings between multiple human participants and perform various functions described herein. In various implementations, an automated assistant configured with selected aspects of the present disclosure may operate at least in part on what will be referred to herein as a "conference computing device." A conference computing device may be any computing device that is capable of executing all or part of an automated assistant and participating in a meeting between multiple human participants using one or more input/output components such as speakers, displays, and in particular, microphones. A variety of computing devices may be especially suitable for use as conference computing devices, such as a standalone interactive speakers, video conference computing systems, vehicle computing systems, etc. However, any computing device with a microphone and at least one output component (e.g., audio or visual) may be used as a conference computing device.

An automated assistant configured with selected aspects of the present disclosure may be set to a conference mode, e.g., at the outset of a multi-participant meeting. In various implementations, the outset of the meeting may be detected based on a calendar entry and/or in response to explicit invocation of conference mode. During the meeting the automated assistant may perform speech-to-text processing on multiple distinct spoken utterances, notably without requiring explicit invocation of the automated assistant prior to each of the multiple distinct spoken utterances. In some scenarios, the conference computing device may be a standalone interactive speaker or video conference computing system that is in a room or area with some, if not all, the meeting participants. However, in other scenarios in which the multiple meeting participants are geographically separated, automated assistants operating on multiple conference computing devices deployed at the multiple locations may perform selected aspects of the present disclosure. Based on text generated from the speech-to-text processing, the automated assistant may perform a variety of functions to improve aspects of the meeting.

In some implementations, the automated assistant may perform semantic processing on the text generated from one or more of the multiple utterances using speech-to-text processing. Based on this semantic processing, the automated assistant may present (e.g., as audio and/or visual output) a variety of information that is pertinent to the meeting discussion. In some implementations, the automated assistant may perform the semantic processing and/or present the resulting information in response to an explicit request from a meeting participant. Additionally or alternatively, in some implementations, the automated assistant may perform the semantic processing and/or present the information when the automated assistant detects a pause in the meeting conversation.

The automated assistant may perform various forms of semantic processing to achieve various goals. In some implementations, the semantic processing may be used to identify one or more topics of conversation, e.g., by way of a topic classifier. In some such implementations, these topics may be used, for instance, to generate search queries (e.g., Internet searches), to maintain a "meeting dialog context" associated with the meeting discussion (which may be used for various purposes, such as disambiguating participant utterances, filling slots of tasks requested of the automated assistant, etc.), and so forth. In implementations in which the automated assistant generates search queries and performs searches based on raised topics (or more generally, based on semantic processing performed on the participants' utterances), the automated assistant may provide, as audio and/or visual output at the conference computing device(s), information that is responsive to the search queries.

As a working example, suppose two meeting participants are planning a ski trip, and one participant says, "We should finalize our ski trip in Switzerland next weekend. Let's pick a resort." After speech-to-text processing is performed to generate text representing this vocal utterance, the automated assistant may perform semantic processing on the text to generate a search query that duplicates or at least summarizes the utterance. In some cases, the automated assistant may combine text generated from multiple utterances from multiple participants into a search query. Information responsive to the search query may include, for instance, a list of one or more ski resorts in Switzerland. If the conference computing device includes or has access to a display, these results may be presented automatically on the display, e.g., much like if one of the users had explicitly performed the search. Alternatively, if the conference computing device includes or has access to a speaker, data indicative of the results may be audibly output at the speaker, e.g., during a pause in conversation. It should be understood that in many implementations in which the available output component is a speaker, less information may be output than if the output component were a display. This is because audio output may be more distracting and/or require more time to be output than visual output, and it may be beneficial to avoid interrupting the flow of the meeting.

In some implementations, information that is output to the participants and/or the ongoing meeting dialog context may be used to perform additional semantic processing on subsequent utterances. For example, and continuing the working example, one or more of the participants may ask follow up questions inspired by the presented results of the Swiss ski resort search query. Suppose a user asks, "how is the skiing there?" In isolation this question may be too ambiguous because the word "there" fails to identify a target resort. However, as alluded to above, automated assistants configured with selected aspects of the present disclosure may be configured to maintain a meeting dialog context that maintains one or more topics of discussion and/or information that has been output by the automated assistant. In this example, the automated assistant may disambiguate "there" to, for instance, the top ranking Swiss ski resort that was presented previously. Or, had the user said something like, "Zermatt looks interesting, how is the skiing there?", then the target ski resort may instead be "Zermatt." In any case, the automated assistant may then generate and submit a search query that seeks information (e.g., ski reports, snow reports, user reviews, etc.) about ski quality at the target resort.

Similar techniques might be employed to generate a suitable search query if the participant were instead to ask, "What will the weather be like?" Once again this statement is too ambiguous in isolation to generate a meaningful weather search query. However, based on the persisted meeting dialog context, the automated assistant may be able to infer that the location to use in the weather search query is the top-ranking resort that was presented previously, and that a time to use in the weather search query is "next weekend." Thus, the automated assistant may search the weather at the top-ranking resort for the following weekend, and may present the results to the participants. This back-and-forth between the participants and/or the automated assistant may continue for other types of information, such as making travel arrangements (e.g., train schedules could be presented), purchasing ski passes, etc.

In some implementations, an automated assistant configured with selected aspects of the present disclosure may be configured to generate, based on the multiple distinct utterances detected during the meeting, a meeting summary. In various implementations, the meeting summary may take the form of a document (e.g., textual and/or graphical) that includes pieces of information such as one or more topics detected by the automated assistant from the meeting discussion, one or more outcomes of the meeting detected by the automated assistant from the meeting discussion, a textual transcript of at least some of the multiple distinct spoken utterances, information about participants in the meeting (e.g., some automated assistants may be able to match voices with voice profiles associated with particular people), and so forth. This meeting summary may be stored, transmitted, and/or shared, e.g., by the automated assistant, to/with one or more of the meeting participants. In some implementations, the meeting summary may be associated with a calendar entry that was created to schedule the meeting.

In some implementations, an automated assistant configured with selected aspects of the present disclosure may be configured to utilize information generated during one meeting using techniques described herein (e.g., the meeting dialog context, the meeting summary) to perform various functions in a subsequent meeting, e.g., follow up meeting. Suppose participants in a first meeting discuss a number of action items that need to be resolved, and these action items are detected by a participating automated assistant and used, for instance, to generate a meeting summary for the first meeting. At a follow up second meeting, the automated assistant may use information from the first meeting's summary and/or information from a meeting dialog context stored from the first meeting to perform various functions described above. For example, suppose a user asks, "OK, what were the action items from last meeting?" The automated assistant may retrieve and output these action items, e.g., as an audible list or on a display. In some implementations, the participants of the second meeting may instruct the automated assistant that one or more of the action items have been completed, or the automated assistant may detect that one or more action items was completed based on semantic processing of participant vocal utterances during the meeting.

In some implementations, the automated assistant may be able to detect on its own whether an action item was completed since the first meeting. For example, suppose, after the first meeting, one of the participants engages with an automated assistant to address an action item (e.g., purchase disposable plate ware). In the second meeting, that action item may not be presented by the participating automated assistant because it has already been addressed. Additionally or alternatively, the action item may be presented as "complete."

In various implementations, automated assistants may determine that two or more meetings are related (e.g., as initial and follow up meetings) in various ways. In some implementations, participants may schedule the meetings, e.g., using electronic calendars, and may explicitly link the meetings. Additionally or alternatively, in some implementations, the automated assistant may automatically detect that two or more meetings are related, e.g., based on titles given to the meetings, overlap in participants in the meeting, documents associated with the meetings, and so forth. In some implementations in which a document (e.g., a calendar entry or an agenda attached thereto) is associated with a meeting, the automated assistant may generate an initial meeting dialog context based on the associated document.

As noted above, audio output generated by the automated assistant during a meeting may be far more distracting than visual output, which participants can ignore. Accordingly, in various implementations, an automated assistant may identify an output modality used by one or more of the conference computing devices that is perceptible to the multiple meeting participants. The automated assistant may then output data pertinent to multiple distinct spoken utterances during the meeting at a frequency that is selected based on the identified output modality. For example, if the conference computing device is a standalone interactive speaker without a display, the automated assistant may provide output (e.g., search results, action item statuses, etc.) less frequently than if the conference computing device included a display. As a specific example in which the output modality is determined to be audio output in a vehicle driven by a driver who is also one of the meeting participants, the frequency at which data pertinent to multiple distinct spoken utterances is presented by the automated assistant may be selected to avoid distracting the driver.

In some implementations, a method performed by one or more processors is provided that includes: setting an automated assistant implemented at least in part on one or more conference computing devices to a conference mode in which the automated assistant performs speech-to-text processing on multiple distinct spoken utterances without requiring explicit invocation of the automated assistant prior to each of the multiple distinct spoken utterances, wherein the multiple distinct spoken utterances are provided by multiple participants during a meeting between the multiple participants; automatically performing, by the automated assistant, semantic processing on first text generated from the speech-to-text processing of one or more of the multiple distinct spoken utterances, wherein the semantic processing is performed without explicit participant invocation; generating, by the automated assistant, based on the semantic processing, data that is pertinent to the first text, wherein the data is output to the multiple participants at one or more of the conference computing devices while the automated assistant is in conference mode; determining, by the automated assistant, that the meeting has concluded; and based on the determining, setting the automated assistant to a non-conference mode in which the automated assistant requires invocation prior to performing speech-to-text processing on individual spoken utterances.

These and other implementations of technology disclosed herein may optionally include one or more of the following features.

In various implementations, the data may be output to the multiple participants as natural language output from the automated assistant via a speaker of one or more of the conference computing devices. In various implementations, the data may be output to the multiple participants via one or more displays that are visible to the multiple participants.

In various implementations, the determining includes: receiving, by the automated assistant, from one of the multiple participants, a spoken invocation that indicates the meeting has concluded; or determining that a current time matches a scheduled end time of the meeting.

In various implementations, the automated assistant may be set to conference mode in response to a spoken invocation that indicates the meeting has begun or an explicit command to enter conference mode. In various implementations, the method may further include performing additional semantic processing on second text generated from speech-to-text processing of one or more of the multiple spoken utterances, wherein the additional semantic processing is performed based at least in part on the data that is pertinent to the first text. In various implementations, the additional semantic processing includes disambiguation of one or more tokens of the second text based on the data that is pertinent to the first text.

In various implementations, the method may further include generating, by the automated assistant based on the multiple distinct utterances, a meeting summary, wherein the meeting summary includes one or more topics detected by the automated assistant from the multiple distinct spoken utterances while the automated assistant was in conference mode. In various implementations, the meeting summary may further include one or more outcomes of the meeting detected by the automated assistant from the multiple distinct spoken utterances while the automated assistant was in conference mode. In various implementations, the meeting summary further includes a textual transcript of at least some of the multiple distinct spoken utterances.

In various implementations, the method may further include: determining that the meeting is related to a prior meeting; and identifying, by the automated assistant, based on information associated with the prior meeting, additional data that was generated during the prior meeting and is pertinent to the current meeting, wherein the additional data is output to the multiple participants at one or more of the conference computing devices while the automated assistant is in conference mode.

In various implementations, the method may further include: identifying an output modality used by one or more of the conference computing devices that is perceptible to the multiple participants; and outputting data pertinent to the multiple distinct spoken utterances at a frequency that is related to the identified output modality. In various implementations, the output modality includes audio output in a vehicle driven by a driver who is also one of the participants, and the frequency at which the data pertinent to the multiple distinct spoken utterances is output is selected to avoid distracting the driver.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 3 demonstrates another example of how techniques described herein may be employed in another scenario, in accordance with various implementations.

FIG. 4 depicts a flowchart illustrating an example method according to implementations disclosed herein.

DETAILED DESCRIPTION

Figure 1:
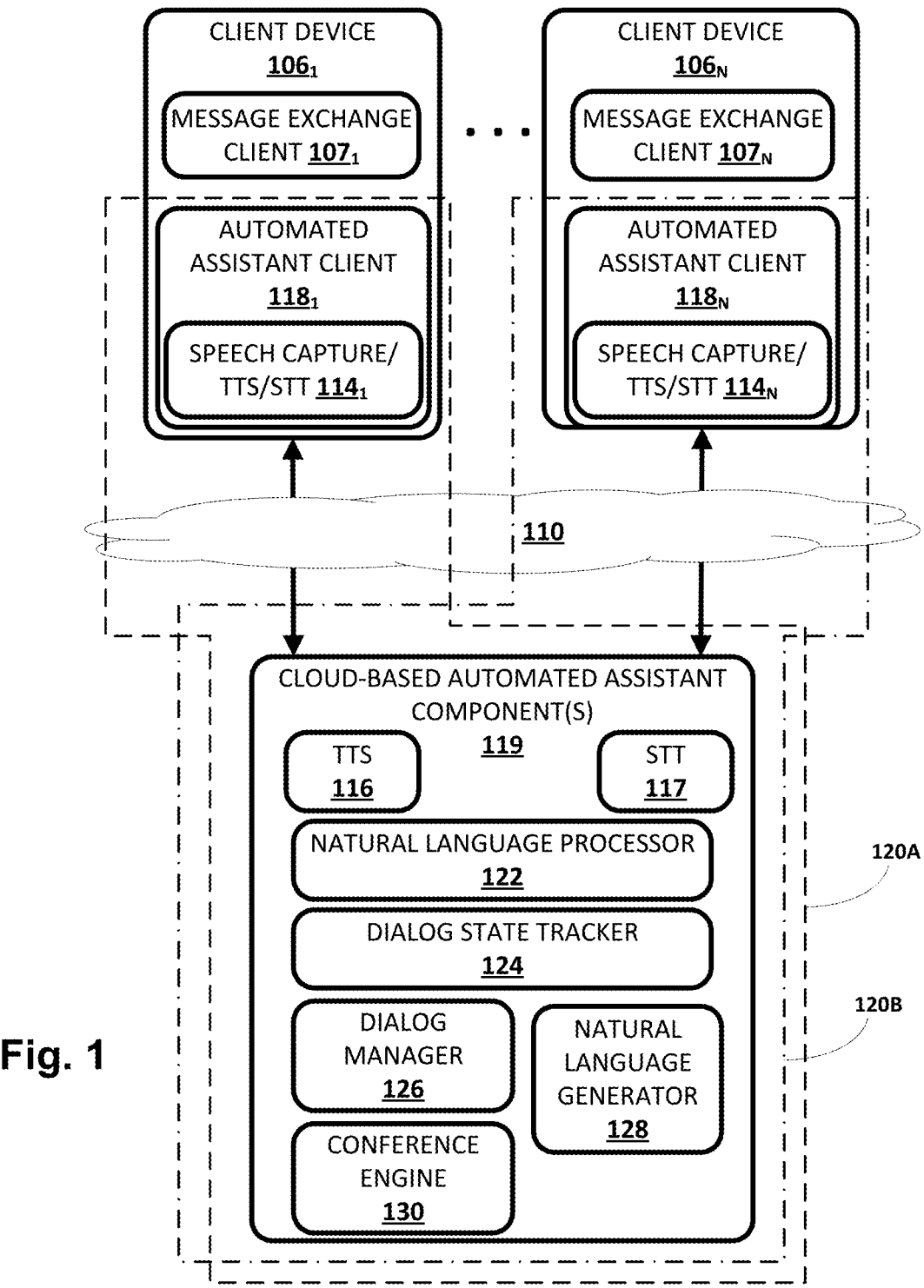
FIG. 1 is a block diagram of an example environment in which implementations disclosed herein may be implemented.

Now turning to FIG. 1, an example environment in which techniques disclosed herein may be implemented is illustrated. The example environment includes one or more client computing devices $106_{1-N}$. Each client device 106 may execute a respective instance of an automated assistant client 118. One or more cloud-based automated assistant components 119, such as a natural language processor 122, may be implemented on one or more computing systems (collectively referred to as a "cloud" computing system) that are communicatively coupled to client devices $106_{1-N}$ via one or more local and/or wide area networks (e.g., the Internet) indicated generally at 110.

As noted in the background, an instance of an automated assistant client 118, by way of its interactions with one or more cloud-based automated assistant components 119, may form what appears to be, from the user's perspective, a logical instance of an automated assistant 120 with which the user may engage in a human-to-computer dialog. Two instances of such an automated assistant 120 are depicted in FIG. 1. A first automated assistant 120A encompassed by a dashed line serves a first user (not depicted) operating first client device $106_1$ and includes automated assistant client 1181 and one or more cloud-based automated assistant components 119. A second automated assistant 120B encompassed by a dash-dash-dot line serves a second user (not depicted) operating another client device $106_N$ and includes automated assistant client $118_N$ and one or more cloud-based automated assistant components 119. It thus should be understood that in some implementations, each user that engages with an automated assistant client 118 executing on a client device 106 may, in effect, engage with his or her own logical instance of an automated assistant 120. For the sakes of brevity and simplicity, the term "automated assistant" as used herein as "serving" a particular user will refer to the combination of an automated assistant client 118 executing on a client device 106 operated by the user and one or more cloud-based automated assistant components 119 (which may be shared amongst multiple automated assistant clients 118). It should also be understood that in some implementations, automated assistant 120 may respond to a request from any user regardless of whether the user is actually "served" by that particular instance of automated assistant 120.

The client devices $106_{1-N}$ may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television, and/or a wearable apparatus of the user that includes a computing device (e.g., a watch of the user having a computing device, glasses of the user having a computing device, a virtual or augmented reality computing device). Additional and/or alternative client computing devices may be provided.

In various implementations, each of the client computing devices $106_{1-N}$ may operate a variety of different applications, such as a corresponding one of a plurality of message exchange clients $107_{1-N}$. Message exchange clients $107_{1-N}$ may come in various forms and the forms may vary across the client computing devices $106_{1-N}$ and/or multiple forms may be operated on a single one of the client computing devices $106_{1-N}$. In some implementations, one or more of the message exchange clients $107_{1-N}$ may come in the form of a short messaging service ("SMS") and/or multimedia messaging service ("MMS") client, an online chat client (e.g., instant messenger, Internet relay chat, or "IRC," etc.), a messaging application associated with a social network, a personal assistant messaging service dedicated to conversations with automated assistant 120, and so forth. In some implementations, one or more of the message exchange clients $107_{1-N}$ may be implemented via a webpage or other resources rendered by a web browser (not depicted) or other application of client computing device 106.

As described in more detail herein, automated assistant 120 engages in human-to-computer dialog sessions with one or more users via user interface input and output devices of one or more client devices $106_{1-N}$. In some implementations, automated assistant 120 may engage in a human-to-computer dialog session with a user in response to user interface input provided by the user via one or more user interface input devices of one of the client devices $106_{1-N}$. In some of those implementations, the user interface input is explicitly directed to automated assistant 120. For example, one of the message exchange clients $107_{1-N}$ may be a personal assistant messaging service dedicated to conversations with automated assistant 120 and user interface input provided via that personal assistant messaging service may be automatically provided to automated assistant 120. Also, for example, the user interface input may be explicitly directed to automated assistant 120 in one or more of the message exchange clients $107_{1-N}$ based on particular user interface input that indicates automated assistant 120 is to be invoked. For instance, the particular user interface input may be one or more typed characters (e.g., @AutomatedAssistant), user interaction with a hardware button and/or virtual button (e.g., a tap, a long tap), an oral command (e.g., "Hey Automated Assistant"), and/or other particular user interface input.

In some implementations, automated assistant 120 may engage in a dialog session in response to user interface input, even when that user interface input is not explicitly directed to automated assistant 120. For example, automated assistant 120 may examine the contents of user interface input and engage in a dialog session in response to certain terms being present in the user interface input and/or based on other cues. In some implementations, automated assistant 120 may engage interactive voice response ("IVR"), such that the user can utter commands, searches, etc., and the automated assistant may utilize natural language processing and/or one or more grammars to convert the utterances into text, and respond to the text accordingly. In some implementations, the automated assistant 120 can additionally or alternatively respond to utterances without converting the utterances into text. For example, the automated assistant 120 can convert voice input into an embedding, into entity representation(s) (that indicate entity/entities present in the voice input), and/or other "non-textual" representation and operate on such non-textual representation. Accordingly, implementations described herein as operating based on text converted from voice input may additionally and/or alternatively operate on the voice input directly and/or other non-textual representations of the voice input.

Each of the client computing devices $106_{1-N}$ and computing device(s) operating cloud-based automated assistant components 119 may include one or more memories for storage of data and software applications, one or more processors for accessing data and executing applications, and other components that facilitate communication over a network. The operations performed by one or more of the client computing devices $106_{1-N}$ and/or by automated assistant 120 may be distributed across multiple computer systems. Automated assistant 120 may be implemented as, for example, computer programs running on one or more computers in one or more locations that are coupled to each other through a network.

As noted above, in various implementations, each of the client computing devices $106_{1-N}$ may operate an automated assistant client 118. In various implementations, each automated assistant client 118 may include a corresponding speech capture/text-to-speech ("TTS")/STT module 114. In other implementations, one or more aspects of speech capture/TTS/STT module 114 may be implemented separately from automated assistant client 118.

Each speech capture/TTS/STT module 114 may be configured to perform one or more functions: capture a user's speech, e.g., via a microphone (which in some cases may comprise presence sensor 105); convert that captured audio to text (and/or to other representations or embeddings); and/or convert text to speech. For example, in some implementations, because a client device 106 may be relatively constrained in terms of computing resources (e.g., processor cycles, memory, battery, etc.), the speech capture/TTS/STT module 114 that is local to each client device 106 may be configured to convert a finite number of different spoken phrases—particularly phrases that invoke automated assistant 120—to text (or to other forms, such as lower dimensionality embeddings). Other speech input may be sent to cloud-based automated assistant components 119, which may include a cloud-based TTS module 116 and/or a cloud-based STT module 117.

Cloud-based STT module 117 may be configured to leverage the virtually limitless resources of the cloud to convert audio data captured by speech capture/TTS/STT module 114 into text (which may then be provided to natural language processor 122). Cloud-based TTS module 116 may be configured to leverage the virtually limitless resources of the cloud to convert textual data (e.g., natural language responses formulated by automated assistant 120) into computer-generated speech output. In some implementations, TTS module 116 may provide the computer-generated speech output to client device 106 to be output directly, e.g., using one or more speakers. In other implementations, textual data (e.g., natural language responses) generated by automated assistant 120 may be provided to speech capture/TTS/STT module 114, which may then convert the textual data into computer-generated speech that is output locally.

Automated assistant 120 (and in particular, cloud-based automated assistant components 119) may include a natural language processor 122, the aforementioned TTS module 116, the aforementioned STT module 117, a dialog state tracker 124, a dialog manager 126, and a natural language generator 128 (which in some implementations may be combined with TTS module 116), and of particular relevance to the present disclosure, a conference engine 130. In some implementations, one or more of the engines and/or modules of automated assistant 120 may be omitted, combined, and/or implemented in a component that is separate from automated assistant 120.

In some implementations, automated assistant 120 generates responsive content in response to various inputs generated by a user of one of the client devices $106_{1-N}$ during a human-to-computer dialog session with automated assistant 120. Automated assistant 120 may provide the responsive content (e.g., over one or more networks when separate from a client device of a user) for presentation to the user as part of the dialog session. For example, automated assistant 120 may generate responsive content in in response to free-form natural language input provided via one of the client devices $106_{1-N}$. As used herein, free-form input is input that is formulated by a user and that is not constrained to a group of options presented for selection by the user.

As used herein, a "dialog session" may include a logically-self-contained exchange of one or more messages between a user and automated assistant 120 (and in some cases, other human participants) and/or performance of one or more responsive actions by automated assistant 120. Automated assistant 120 may differentiate between multiple dialog sessions with a user based on various signals, such as passage of time between sessions, change of user context (e.g., location, before/during/after a scheduled meeting, etc.) between sessions, detection of one or more intervening interactions between the user and a client device other than dialog between the user and the automated assistant (e.g., the user switches applications for a while, the user walks away from then later returns to a standalone voice-activated product), locking/sleeping of the client device between sessions, change of client devices used to interface with one or more instances of automated assistant 120, and so forth. As will described in more detail below, in some implementations, automated assistant 120 may, e.g., by way of conference engine 130, facilitate a "conference dialog session" in which automated assistant 120 is transitioned into a "conference mode" in which it does not require explicit invocation prior to each oral (or written statement) in order to perform various functions, such as natural language processing.

Natural language processor 122 (alternatively referred to as a "natural language understanding engine") of automated assistant 120 processes free form natural language input generated by users via client devices $106_{1-N}$ and in some implementations may generate annotated output for use by one or more other components of automated assistant 120. For example, the natural language processor 122 may process natural language free-form input that is generated by a user via one or more user interface input devices of client device $106_1$. The generated annotated output may include one or more annotations of the natural language input and optionally one or more (e.g., all) of the terms of the natural language input.

In some implementations, the natural language processor 122 is configured to identify and annotate various types of grammatical information in natural language input. For example, the natural language processor 122 may include a part of speech tagger (not depicted) configured to annotate terms with their grammatical roles. For example, the part of speech tagger may tag each term with its part of speech such as "noun," "verb," "adjective," "pronoun," etc. Also, for example, in some implementations the natural language processor 122 may additionally and/or alternatively include a dependency parser (not depicted) configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the natural language processor 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. For example, a "banana" node may be connected (e.g., as a child) to a "fruit" node," which in turn may be connected (e.g., as a child) to "produce" and/or "food" nodes. As another example, a restaurant called "Hypothetical Café" may be represented by a node that also includes attributes such as its address, type of food served, hours, contact information, etc. The "Hypothetical Café" node may in some implementations be connected by an edge (e.g., representing a child-to-parent relationship) to one or more other nodes, such as a "restaurant" node, a "business" node, a node representing a city and/or state in which the restaurant is located, and so forth.

The entity tagger of the natural language processor 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 122 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 122 may rely on annotations from one or more other components of the natural language processor 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 122 may use related prior input and/or other related data outside of the particular natural language input to determine one or more annotations.

In some implementations, dialog state tracker 124 may be configured to keep track of a "dialog state" that includes, for instance, a belief state of a one or more users' goals (or "intents") over the course of a human-to-computer dialog session, across multiple dialog sessions, and/or during a conference dialog session. In determining a dialog state, some dialog state trackers may seek to determine, based on user and system utterances in a dialog session, the most likely value(s) for slot(s) that are instantiated in the dialog. Some techniques utilize a fixed ontology that defines a set of slots and the set of values associated with those slots. Some techniques additionally or alternatively may be tailored to individual slots and/or domains. For example, some techniques may require training a model for each slot type in each domain.

Dialog manager 126 may be configured to map a current dialog state, e.g., provided by dialog state tracker 124, to one or more "responsive actions" of a plurality of candidate responsive actions that are then performed by automated assistant 120. Responsive actions may come in a variety of forms, depending on the current dialog state. For example, initial and midstream dialog states that correspond to turns of a dialog session that occur prior to a last turn (e.g., when the ultimate user-desired task is performed) may be mapped to various responsive actions that include automated assistant 120 outputting additional natural language dialog. This responsive dialog may include, for instance, requests that the user provide parameters for some action (i.e., fill slots) that dialog state tracker 124 believes the user intends to perform. In some implementations, responsive actions may include actions such as "request" (e.g., seek parameters for slot filling), "offer" (e.g., suggest an action or course of action for the user), "select," "inform" (e.g., provide the user with requested information), "no match" (e.g., notify the user that the user's last input is not understood), and so forth.

Conference engine 130 may be configured to facilitate a "conference mode" of automated assistant 120 that enables automated assistant 120 to "participate" in meetings between multiple human participants and perform various functions. In various implementations, automated assistant 120 configured with selected aspects of the present disclosure may operate at least in part on what will be referred to herein as a "conference computing device." A conference computing device may be any computing device, including one or more client devices 106, that is capable of participating in a meeting between multiple human participants using one or more input/output components such as speakers, displays, and in particular, microphones. A variety of computing devices may be especially suitable for use as conference computing devices, such as a standalone interactive speakers, video conference computing systems, vehicle computing systems, etc. However, any computing device with a microphone and at least one output component (e.g., audio or visual) may be used as a conference computing device.

In various implementations, conference engine 130 may be configured set automated assistant 120 to the aforementioned "conference mode" to cause automated assistant 120 to perform speech-to-text processing (e.g., by way of STT 117) on multiple distinct spoken utterances without requiring explicit invocation of automated assistant 120 prior to each of the multiple distinct spoken utterances. In many cases, the multiple distinct spoken utterances may be provided by multiple participants during a meeting or conference between the multiple participants. By performing natural language processing and other processing of spoken user utterances without requiring explicit invocation each time, automated assistant 120 may be able to perform a variety of functions that may be helpful to participants of the meeting.

For example, in some implementations, while in conference mode, automated assistant 120 may be free to provide information to the participants that is based on the participants' discussion. More particularly, in some implementations, automated assistant 120 may automatically (i.e., without requiring an explicit command from a participant) perform semantic processing (e.g., by way of natural language processor 122 and/or other cloud-based automated assistant components 119) on first text generated from the speech-to-text processing of one or more of the multiple distinct spoken utterances provided by the meeting participants. If automated assistant 120 were not in conference mode, it would not perform such semantic processing within explicit invocation. Based on the semantic processing, automated assistant 120 may generate data that is pertinent to the text that was semantically processed. For example, if the text was generated from a user utterance that included a question, the text may be used to generate a search query that automated assistant 120 submits to one or more databases. Data responsive to the search query may then be obtained by automated assistant 120 and output to the multiple meeting participants at one or more of the conference computing devices. Examples of such a scenario will be described below.

Not every participant utterance is worthy of a response by automated assistant 120. For example, participants may engage in informal banter during the meeting to which they may not desire automated assistant 120 react. Accordingly, in various implementations, automated assistant 120 may analyze various criteria to determine whether to inject into meetings content it retrieves based on semantic processing of the participants' discussions. In some implementations, automated assistant 120 may determine a relevancy score associated with information it obtains responsive to a participant's utterance. If the retrieved information has a relevancy score that satisfies some minimum relevancy threshold, automated assistant 120 may potentially incorporate the information into the discussion (e.g., subject to other constraints related to modality described below). On the other hand, if the retrieved information has a relevancy score that fails to satisfy such a threshold, automated assistant 120 may refrain from incorporating the information into the meeting discussion because that information may not likely be useful to, or well-received by, the participants.

Automated assistant 120 may perform a variety of other functions while in conference mode to aid the meeting participants. For example, automated assistant 120 may provide audio or visual output that provides the participants with information about an agenda, document(s), or other information associated with the meeting. Suppose a meeting is scheduled using an electronic/online calendar system, and that the calendar entry includes a meeting agenda prepared by, for instance, one of the participants. Such a meeting agenda may include various information, such as topic(s) for discussion, action items and their associated statuses (e.g., complete or incomplete), participant identities, agenda items subject to a vote, relationship of the current meeting to prior or future meetings, and so forth.

In some implementations, such meeting agenda may be displayed and/or re-displayed continuously and/or periodically displayed during the meeting. For example, in some implementations, automated assistant 120 may be configured with a topic classifier that identifies, from text generated from participant utterances, one or more topics that are raised and/or identifies when discussion has transitioned between different topics. Such a topic classifier may employ a variety of known techniques of topic classification that are often used for document classification, such as expectation maximization, term-frequency-inverse document frequency ("TF-IDF"), naïve Bayes classification, latent semantic indexing, support vector machines, artificial neural networks, decision trees, concept mining, etc.

In some implementations in which the meeting agenda includes action items, automated assistant 120 may be configured to semantically process utterances provided by the participants during the meeting to determine whether the action items have been addressed (e.g., resolved, delayed, modified, canceled, etc.). Automated assistant 120 may, when it displays the agenda, modify the displayed information about the action items accordingly. One example of this is described below with respect to FIG. 2C. Also, in some implementation in which a sequence of slides is being presented, automated assistant 120 may semantically process participants' utterances to automatically advance the slides through the sequence.

In some implementations, automated assistant 120 may, e.g., after being transitioned from the conference mode back to a non-conference or "normal" mode in which it requires explicit invocation prior to semantically processing an utterance, generate a meeting summary. In some implementations, the meeting summary may be similar to the meeting agenda, except that the meeting summary may be annotated based on content of the meeting participants' discussion learned through semantic processing of the meeting's discussion. Additionally or alternatively, and particularly where no meeting agenda was prepared prior to the meeting, automated assistant 120 may newly generate a meeting summary solely based on semantic processing of the participants' discussion.

Meeting summaries generated by automated assistant 120 may include a variety of other information. In addition to or instead of information that might also be included in a meeting agenda, a meeting summary generated using techniques described herein may include topics discussed (which may be detected at least in part by way of the aforementioned topic classifier), action items created/addressed/modified, outcomes of the meeting (e.g., booking a venue, purchasing tickets, vote outcomes, etc.), a partial or whole transcript of some or all participants' utterances during the meeting, a next (or follow up) meeting if the participants' discussed scheduling one, and so forth.

In various implementations, automated assistant 120 may determine, e.g., by way of conference engine 130, when a meeting begins and/or concludes—and hence, when automated assistant 120 should transition between conference mode and normal mode—using a variety of cues. In some implementations, a meeting participant may issue an explicit command, such as "Hey Assistant, let's start the meeting," to cause automated assistant 120 to transition into conference mode. Additionally or alternatively, in some implementations, automated assistant 120 may infer when to transition from normal mode to conference mode based on user utterances. For example, automated assistant 120 may transition from normal mode to conference mode when a participant says, e.g., to another participant (and not directly to automated assistant 120), something like, "OK, let's get started" or "Let's bring this meeting to order." If the meeting is a type of meeting with in which formal procedures are supposed to be followed, such as a public hearing, a non-profit board meeting, etc., then phrases that are commonly and/or official uttered to initiate such formal meetings may be detected and cause automated assistant 120 to transition from normal mode to conference mode. In some implementations, automated assistant 120 may be configured to tally votes cast by participants at such meetings.

In some implementations, automated assistant 120 may have access to one or more electronic calendar entries that indicate a meeting is to take place at a particular time and/or location. In some such implementations, automated assistant 120 may automatically transition into conference mode at the meeting's scheduled starting time, and/or at some point after the schedule starting time when automated assistant 120 detects (e.g., using one or more microphones and/or cameras) that at least some of the participants are co-present at a designated meeting location. Similarly, automated assistant 120 may determine when to transition from conference mode back into normal mode based on explicit user instruction (e.g., "Hey Assistant, let's end the meeting"), implicit user utterances (e.g., "Let's call it a day"), and/or formalized utterances (e.g., "This meeting is adjourned").

There are various challenges associated with an automated assistant 120 automatically incorporating content into a meeting between multiple human participants. If the human participants are speaking to each other, and not to automated assistant 120, it might be distracting for automated assistant 120 to provide content when a participant is expecting feedback from another participant. If automated assistant 120 is too quick to provide search results in response to a speaker's utterance that includes a question (which automated assistant 120 might submit as a search query), the presentation of responsive content, especially if done audibly, may be distracting and/or interrupt one or more participants who had intended to respond to the speaker's utterance. Moreover, if automated assistant 120 provides responsive content for too many participant utterances, the participants may become distracted and/or inundated with too much information. In other words, automated assistant 120 may become intrusive.

Accordingly, in various implementations, automated assistant 120 may be configured to exercise various levels of discretion when outputting content to meeting participants (also referred to as "injecting content into the discussion"), based on a variety of cues. In some implementations, when automated assistant 120 semantically processes a participant's utterance and has retrieved responsive content, automated assistant 120 may wait for a pause in the conversation (e.g., a predetermined time interval such as five seconds, etc.) before it provides the responsive content as output. In some such implementations, if no such pause occurs, e.g., because the meeting participants continue their discussion in earnest, automated assistant 120 may wait for a pause or discard the responsive content, especially if automated assistant 120 determines that the context of the discussion has changed (e.g., a new topic of discussion is detected). In some implementations, automated assistant 120 may discard such responsive content if there is no pause in the conversation for some predetermined time interval, such as one minute, five minutes, thirty seconds, etc.

In some implementations, automated assistant 120 may exercise a level of discretion when automatically injecting content into the discussion that is commensurate with a type of output modality available to automated assistant 120. Audible output, e.g., provided by a client device 106 in the form of a standalone speaker or conference telephone configured with selected aspects of the present disclosure, may be distracting if presented too frequently. By contrast, visual output may be less distracting. Thus, if automated assistant 120 is able to provide visual output on a display, e.g., a conference television screen or even individual computer screens viewed by the participants, automated assistant 120 may exercise a relatively low level of discretion when determining whether and/or when to output content. On the other hand, if automated assistant 120 is only able to provide audible output via one or more speakers, automated assistant 120 may exercise a greater level of discretion when determining whether and/or when to output content.

Examples described herein are primarily directed to scenarios in which a plurality of meeting participants are physically co-located with a client device 106 such as a standalone interactive speaker and/or display that operates an automated assistant 120 configured with selected aspects of the present disclosure. However, this is not meant to be limiting. Techniques described herein are equally applicable in scenarios in which meeting participants are not co-located. For example, suppose two or more participants are conducting a meeting using video conferencing, e.g., with each user sitting in front of his or her own computer. In some implementations, automated assistant 120 may provide the same output to each participant on their respective screen. In other implementations, automated assistant 120 may provide different content to each participant on their screen, e.g., depending on individual participant preferences, individual participant content (e.g., one participant may be in a public place and might not want potentially sensitive information displayed), and so forth. In scenarios in which two meeting participants are not co-located and are operating client devices 106 with different output modalities—e.g., one audio, one visual—automated assistant 120 may provide (or "push") more content to be presented to the participant with visual output capabilities than the participant with exclusively audio output capabilities.

FIGS. 2A-D demonstrate one example of a meeting between multiple participants $202_{1-3}$ in which automated assistant 120 "participates" by way of being executed at least in part on one or more client devices $206_{1-2}$. In this example, first client device $206_1$ takes the form of a standalone interactive speaker with a microphone (not specifically depicted) and second client device $206_2$ takes the form of a smart television with display capabilities. For this example, it can be assumed that the participants $202_{1-3}$ scheduled the meeting using an electronic calendar, and that there was an agenda defined by one of the participants, either in the calendar entry or in a separate document attached to the calendar entry.

Figure 2A:
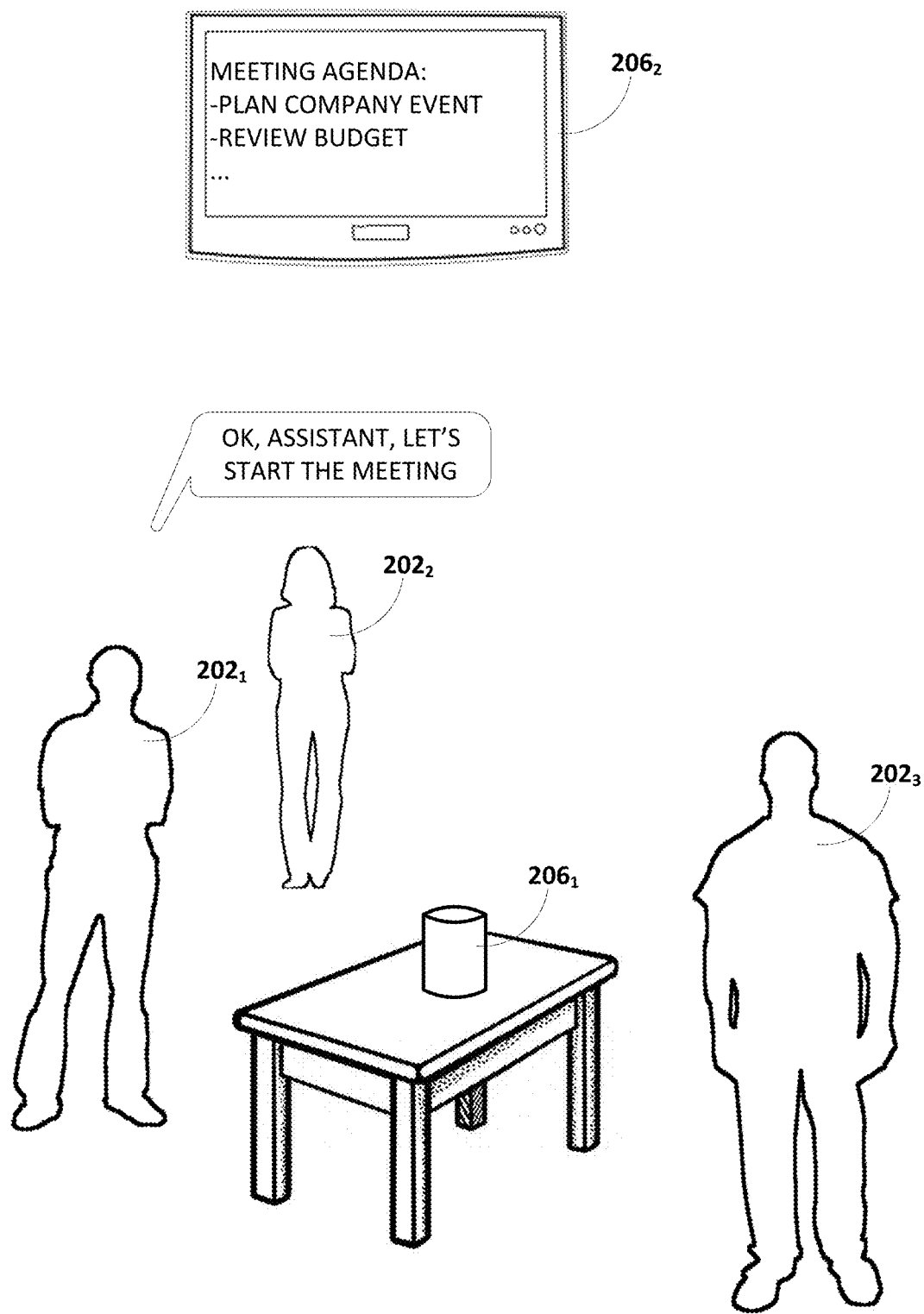
FIGS. 2A, 2B, 2C, and 2D depict one example of how techniques described herein may be employed in a particular scenario, in accordance with various implementations.

In FIG. 2A, a first participant $202_1$ initiates the meeting by speaking the utterance, "OK, Assistant, let's start the meeting." This is an example of an explicit command for automated assistant 120 to transition from a non-conference or normal mode to the conference mode described above. An agenda for the meeting is displayed on second client device $206_2$, e.g., at the behest of automated assistant 120. The agenda includes two topics: "Plan company event" and "review budget." In some implementations, the agenda may be displayed upon transition of automated assistant 120 to conference mode.

Figure 2B:
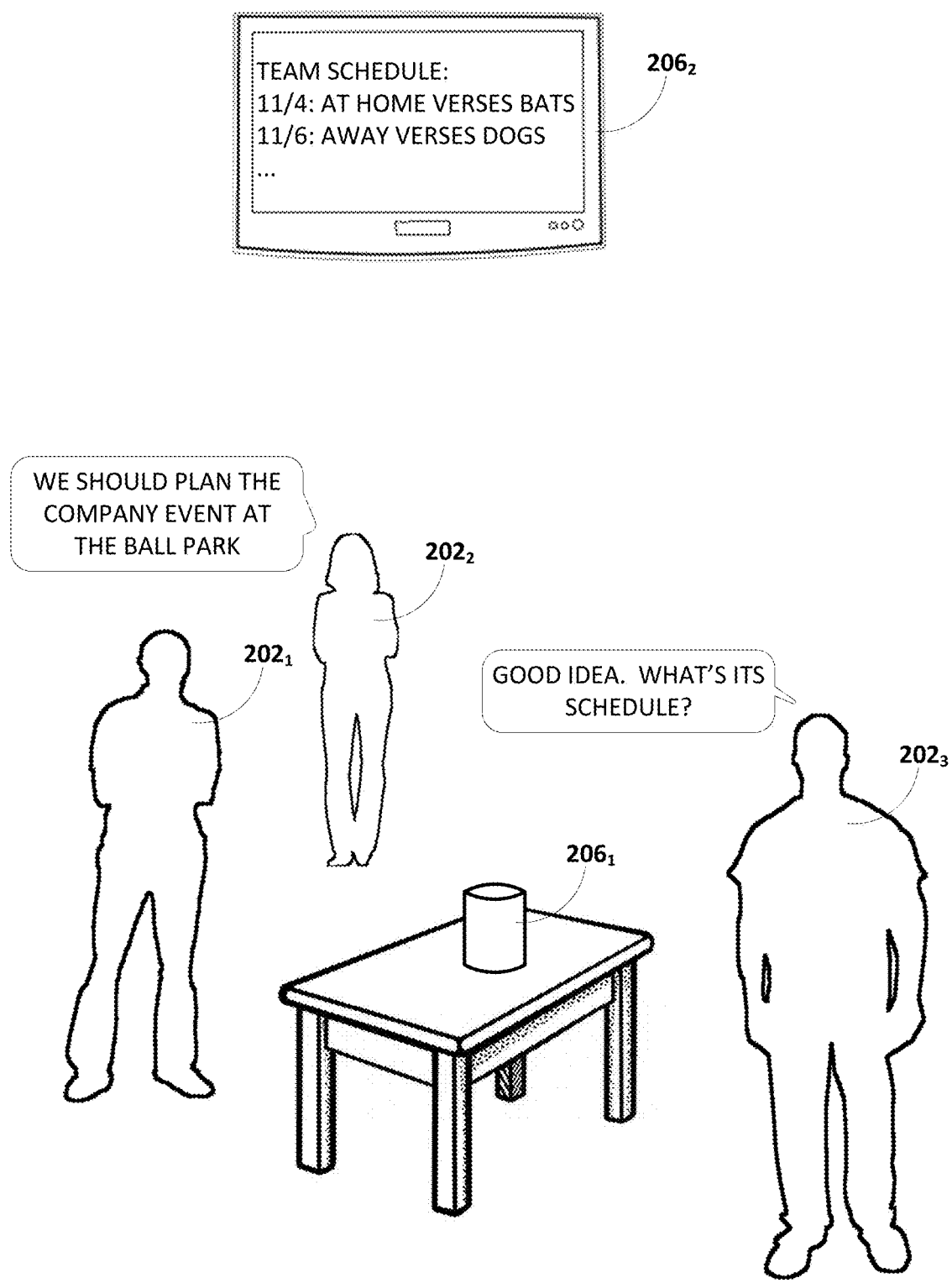

In FIG. 2B, a second participant $202_2$ says, "We should plan the company event at the ball park." Based on semantic processing of this utterance, automated assistant 120 may determine that she is referring to the first item on the meeting agenda ("Plan company event"). Automated assistant 120 may also determine, e.g., by way of the entity tagger discussed previously, that "ball park" is a reference to a particular venue associated with a particular sports team. While not depicted in FIG. 2B, in some implementations, at this point automated assistant 120 may cause second client device $206_2$ to display various information about the ball park, such as pictures, a link to its website, information about the sports team, etc. The third participant 2023 responds to the second participant's statement by asking, "Good idea, what's its schedule?" Automated assistant 120, e.g., by way of the coreference resolver described previously, may resolve the word "its" to the sports team it identified previously. Then, automated assistant 120 may generate and submit a search query for the sports team's schedule, and may display responsive data on second client device $206_2$, as is depicted in FIG. 2B.

Figure 2C:
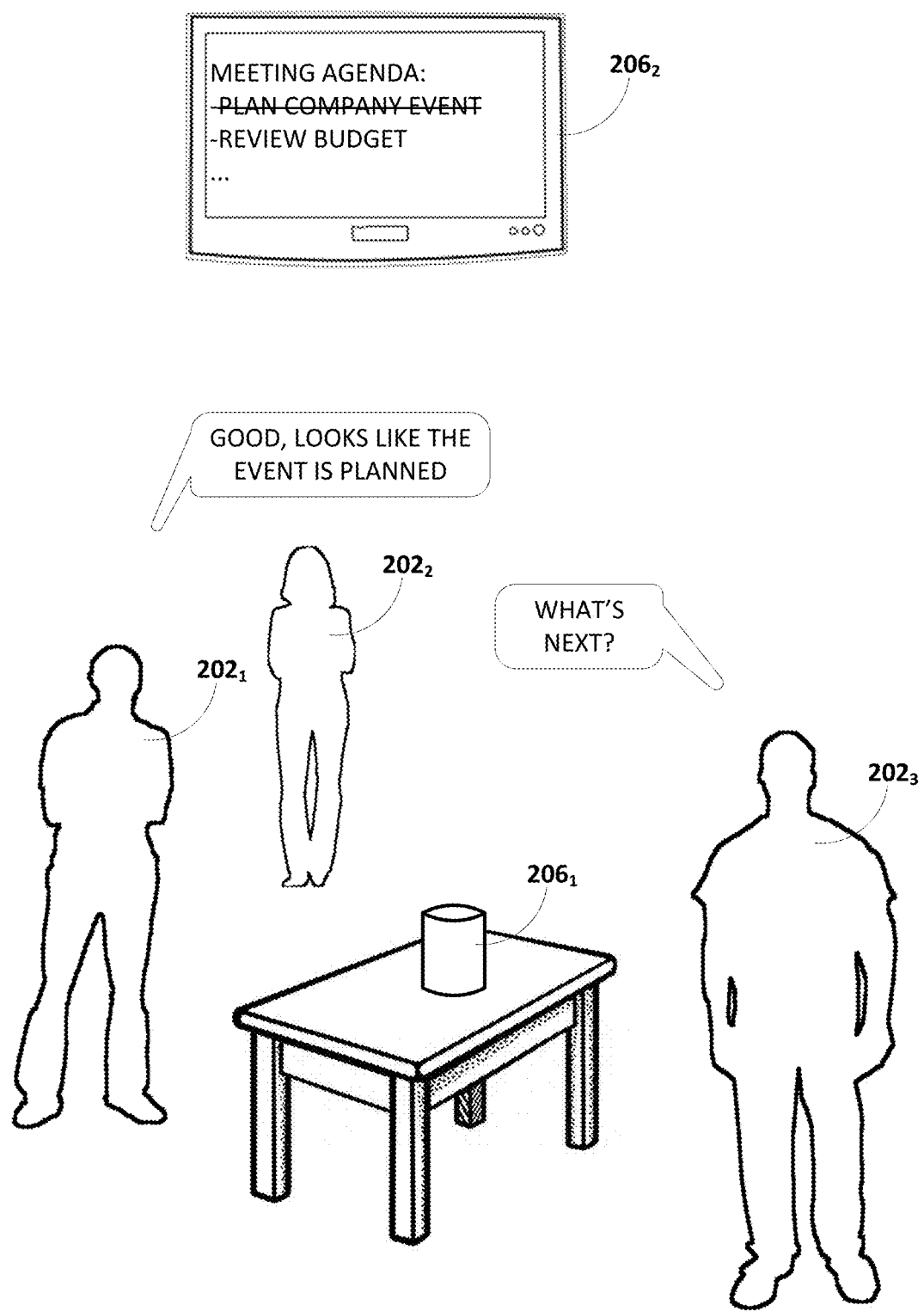

FIG. 2C depicts the same meeting at a later stage, after participants $202_{1-3}$ have concluded discussing the company event and are pivoting to the next topic. The first participant $202_1$ says "Good, looks like the event is planned." Automated assistant 120 may semantically process this utterance and associate it with one of the meeting agenda items (e.g., the first action item "Plan company event"). Additionally, automated assistant 120 may determine, based on the semantic processing, that this particular agenda item has been addressed. Accordingly, automated assistant 120 may render (or re-render) the meeting agenda on second client device $206_2$ with the meeting agenda item "Plan company event" depicted as being completed, e.g., with the strike-through depicted in FIG. 2C or another visual indicator (e.g., check box, font, etc.). By rendering the meeting agenda at this point in the discussion when it appears participants $202_{1-3}$ are transitioning to a different topic, the participants $202_{1-3}$ are reminded of the next topic of discussion, which in this case is to review a budget. This helps keep the meeting focused and the participants on-topic.

Figure 2D:
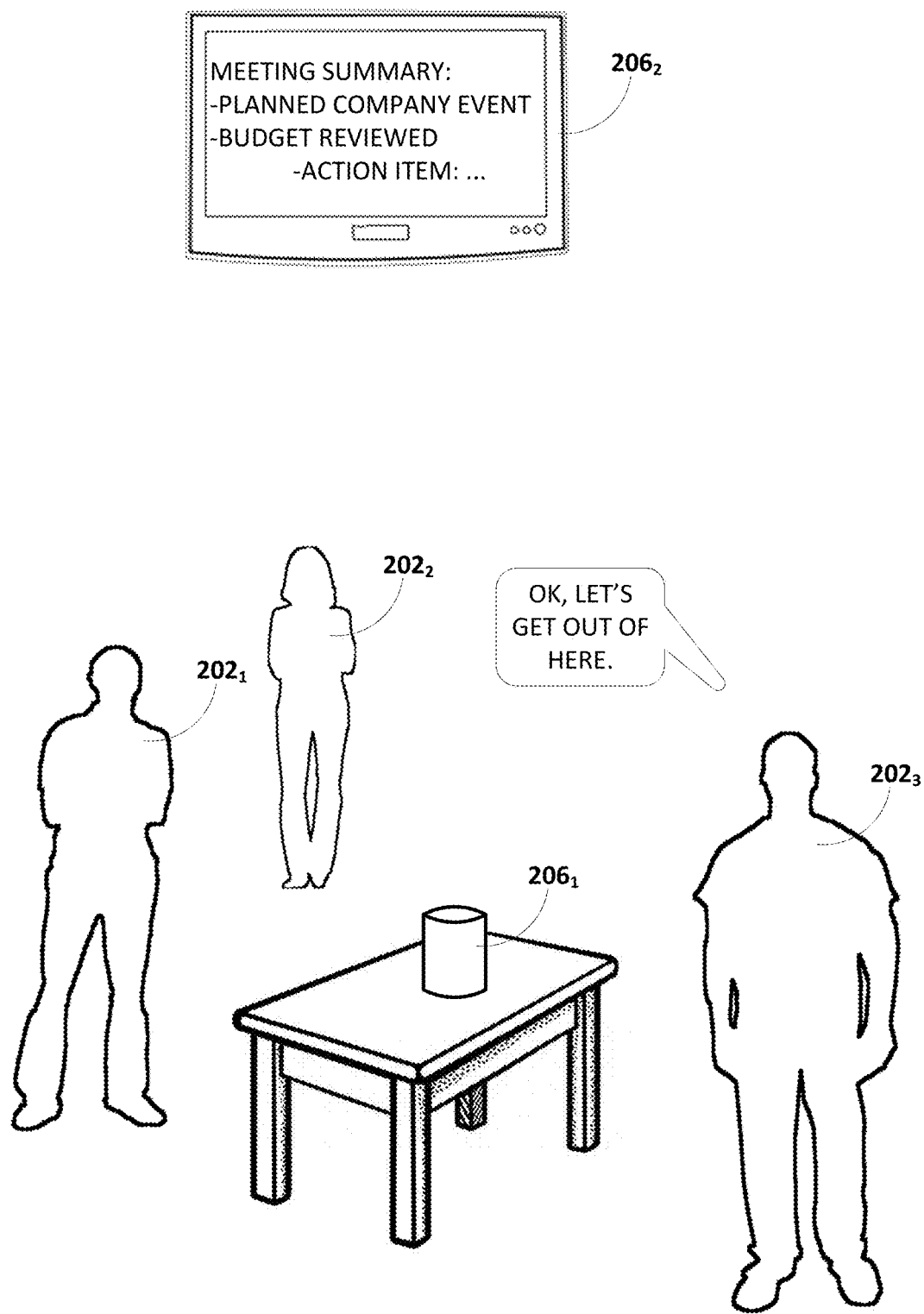

FIG. 2D depicts one example of what might happen at the conclusion of the meeting. The third participant $2023$ says, "OK, let's get out of here." As described previously, automated assistant 120 may semantically process this utterance to infer that the meeting has concluded. Consequently, in FIG. 2D, automated assistant 120 may take a number of actions, including displaying a meeting summary on second client device $206_2$ and transitioning from conference mode to non-conference or normal mode. In this example, the displayed meeting summary includes a list of topics discussed, which may or may not have been generated in part from the original meeting agenda. Here, the meeting summary includes outcomes of the meeting, including that the company event was planned and the budget was reviewed. In addition, the meeting summary includes an action item that was discussed by the participants $202_{1-3}$ during the meeting, e.g., in relation to the budget review, and detected semantically by automated assistant 120.

In some implementations, a meeting summary such as that depicted in FIG. 2D may be provided to one or more of the meeting participants, e.g., by way of email or file sharing. In some implementations in which it is determined by automated assistant 120 that a follow up meeting is planned (e.g., from semantic processing of the discussion during the meeting or by way of a new calendar entry that is linked to the original calendar entry), the meeting summary may be saved and presented at the follow meeting, e.g., as a meeting agenda. In some implementations, automated assistant 120 may automatically detect when two meetings are related and hence may share agenda and/or topics. For example, automated assistant 120 may examine metadata associated with the multiple meetings (e.g., titles), or determine that the multiple meetings share participants. In some implementations, automated assistant 120 may detect patterns among multiple meetings that suggest a regularly scheduled meeting, and may "carry over" a meeting summary across the multiple meetings.

In some implementations, automated assistant 120 may identify meeting participants in various ways, e.g., for purposes of pushing meeting agendas and/or summaries to those participants. As a simple example, a calendar entry may explicitly identify the meeting participants, which automated assistant 120 may use to determine email addresses of the participants. Additionally or alternatively, in some implementations, automated assistant 120 may be configured to perform speech recognition to identify meeting participants, and then may match the identified participants to known user profiles. As another example, in some implementations, the participant's may explicitly identify themselves, e.g., at the outset of the meeting as part of introductions, and automated assistant 120 may detect the spoken names (and can, for instance, add those names to the meeting summary).

In the example scenario of FIGS. 2A-D, all the meeting participants are co-located in a single location. However, as noted above this is not meant to be limiting. FIG. 3 depicts an example of a meeting that occurs between a first participant (not depicted) operating a first client device $3061$ in the form of a desktop computer, and a second participant (not depicted) that is driving a vehicle 340 that includes an in-vehicle computing system that forms a second client device $3062$. For this example, it can be assumed that the first participant is able to speak or type free-form natural language input that is semantically processed by automated assistant 120, but that the second participant is limited (due to driving) to only providing spoken free-form natural language input. Automated assistant 120 is able to provide information visually and/or audibly at first client device $3061$ but only audibly at second client device $3062$, because visual output might distract a participant who is driving.

Suppose the first participant at first client device $3061$ says something during the meeting like "Do you want to go to Lexington this weekend?", and that the second (driving) user operating client device $3062$ responds, "Maybe, depends on the weather." Automated assistant 120 may perform semantic processing on these utterances to generate one or more search queries and retrieve information about Lexington and Lexington's weather this weekend. Because the first participant is operating first client device $3061$, which has a display, automated assistant 120 may exercise relatively little discretion in selecting responsive information to present. This is because the first participant is not known to be engaged in an activity like driving and because visual output is most likely less distracting. Accordingly, a wealth of responsive information is presented visual at first computing device $3061$, including other points of interest about Lexington itself, the weather in Lexington on Sunday, and points of interest within an hour of Lexington.

By contrast, automated assistant 120 is only able to push information to the second participant driving the vehicle 340 using audio output. Accordingly, automated assistant 120 may be far more selective about the information it provides. For example, while the participants are generally discussing the location of Lexington, they have not explicitly asked each other about points of interest. Accordingly, a relevancy score associated with the various points of interest that are displayed on first client device $3061$ may not satisfy a minimum relevancy score that is used for a driving participant. Consequently, while the first participant sees all the information about Lexington, the second participant driving vehicle only hears the most relevant information, namely, the weather in Lexington on Sunday.

Thus it can be seen that in various implementations, automated assistant 120 may adjust a relevancy threshold based on a context of a meeting participant. As another example, suppose the first user in FIG. 3 is operating first client device $3061$ to do work (e.g., draft a document, work in a spreadsheet, perform research, etc.). In that context, it might not be desirable to visually inundate or distract the first participant with information related to the conversation. Accordingly, automated assistant 120 may adjust a relevancy threshold associated with to the first participant to be more closely aligned with the heightened relevancy threshold associated with the second, driving participant. For example, despite having display capabilities, because the first participant is using the display for other purposes, automated assistant 120 may elect to push information to the first participant audibly, rather than visual, to avoid distracting the first participant.

FIG. 4 is a flowchart illustrating an example method 400 according to implementations disclosed herein. For convenience, the operations of the flow chart are described with reference to a system that performs the operations. This system may include various components of various computer systems, such as one or more components of computing systems that implement automated assistant 120. Moreover, while operations of method 400 are shown in a particular order, this is not meant to be limiting. One or more operations may be reordered, omitted or added.

At block 402, the system may set an automated assistant 120 implemented at least in part on one or more conference computing devices to a conference mode in which the automated assistant performs speech-to-text processing on multiple distinct spoken utterances without requiring explicit invocation of the automated assistant prior to each of the multiple distinct spoken utterances. As described herein, in various implementations, the multiple distinct spoken utterances may be provided by multiple human participants during a meeting between the multiple participants.

At block 404, the system may automatically perform semantic processing on first text generated from the speech-to-text processing of one or more of the multiple distinct spoken utterances. In particular, the semantic processing may be performed without explicit participant invocation. And in fact, in various implementations, the system may perform semantic processing on text generated from all participant utterances. If a particular participant utterance is indecipherable, it may not be possible to convert the speech to text, in which case automated assistant 120 takes no action. If a particular participant utterance is decipherable but when semantically processed does not yield information that is relevant to the meeting discussion (e.g., relevancy score fails to satisfy relevancy threshold), automated assistant 120 may take no action on the retrieved information. However if the information retrieved based on the semantic processing satisfies some criterion, such as a relevancy threshold, at block 406, the system may generate pertinent data (e.g., natural language output) based on the information obtained as a result of the semantic processing and output (at block 408) that pertinent data to one or more of the multiple participants at one or more of the conference computing devices.

At block 410, the system may determine that the meeting has concluded. As noted above, this determination may be made in response to an explicit command from a participant ("OK Assistant, let's conclude the meeting"), inferred from an utterance of a user ("This meeting is adjourned"), or made in response to other user input, such as tapping a surface of a standalone interactive speaker that is being used as a conference computing device. In response to the determination of block 410, at block 412, the system may set automated assistant 120 to a non-conference mode in which the automated assistant requires invocation prior to performing speech-to-text processing on individual spoken utterances.

At block 414, in some implementations, the system may generate, e.g., based on semantic processing of multiple utterances provided by the meeting participants during the meeting, a meeting summary. As noted above, the meeting summary may include things like topics discussed, action items (created, resolved, modified, etc.), participants, and/or a partial or complete transcript of the meeting. In some implementations, the transcript may be annotated with or otherwise include not only the participants' utterances, but also any information injected into the meeting by automated assistant 120.

Figure 5:
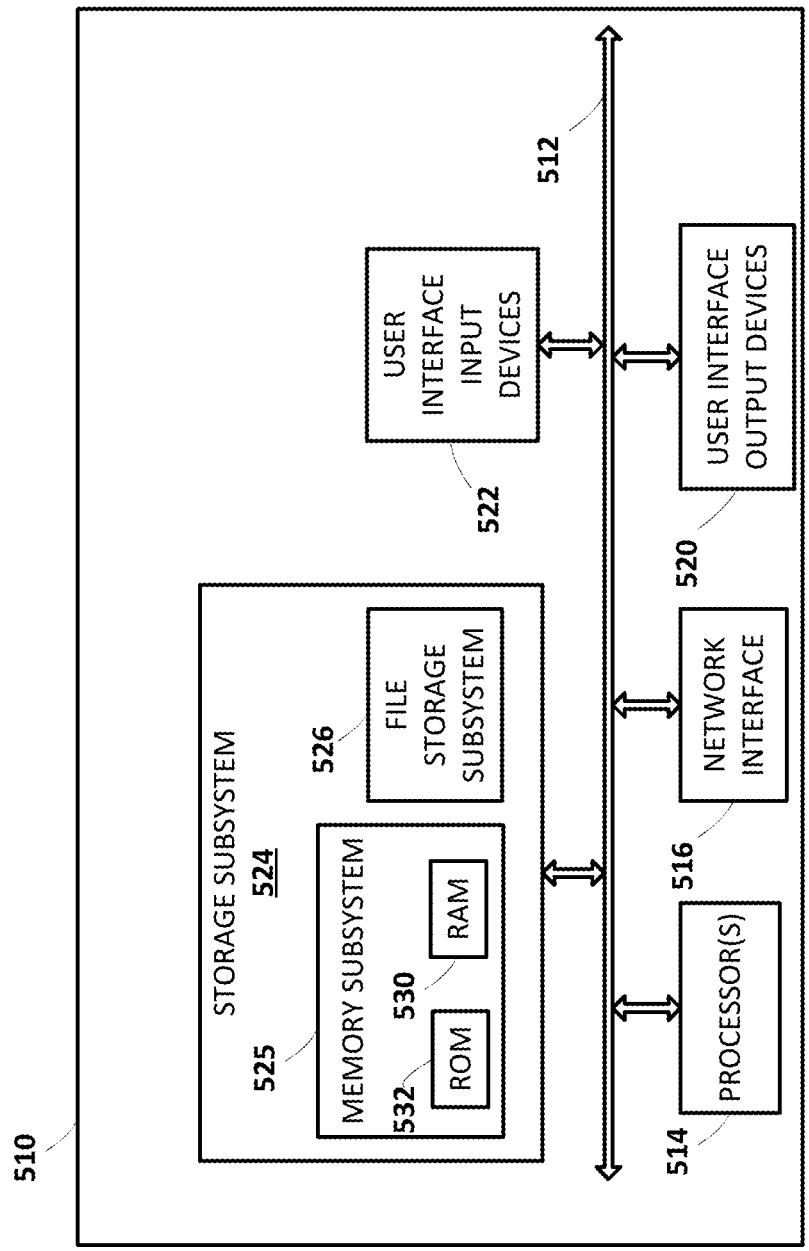
FIG. 5 illustrates an example architecture of a computing device.

FIG. 5 is a block diagram of an example computing device 510 that may optionally be utilized to perform one or more aspects of techniques described herein. Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the method of FIG. 4, as well as to implement various components depicted in FIG. 1.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:
   setting an automated assistant implemented at least in part on one or more conference computing devices to a conference mode in which the automated assistant performs speech-to-text processing on multiple distinct spoken utterances exchanged during a conversation between multiple participants, without requiring explicit invocation of the automated assistant prior to each of the multiple distinct spoken utterances;
   automatically performing, by the automated assistant, semantic processing on first text generated from the speech-to-text processing of a first spoken utterance of the multiple distinct spoken utterances, wherein the semantic processing is performed without explicit participant invocation;
   generating, by the automated assistant, based on the semantic processing, a first query;
   obtaining first information that is responsive to the first query;
   monitoring, by the automated assistant, the conversation for a pause of at least a first predetermined time interval;
   in response to detecting, based on the monitoring, the pause of at least the first predetermined time interval in the conversation, providing audible output that conveys at least part of the first information that is responsive to the first query to the multiple participants at one or more of the conference computing devices while the automated assistant is in conference mode;
   in response to determining that a second predetermined time interval since the first spoken utterance that was used to generate the first query has passed without the pause being detected, determining that a relevancy score of the first information fails to satisfy a minimum relevancy threshold; and
   providing output that conveys second information that is responsive to a second query generated based on a second spoken utterance that occurred subsequent to the first spoken utterance, wherein the second predetermined time interval is greater than the first predetermined time interval.

2. The method of claim 1, further comprising, in response to determining that the second predetermined time interval has passed without the pause being detected, outputting the first information after a conclusion of the conversation.

3. A system comprising one or more processors and memory storing instructions that, in response to execution of the instructions by the one or more processors, cause the one or more processors to:
   set an automated assistant implemented at least in part on one or more conference computing devices to a conference mode in which the automated assistant performs speech-to-text processing on multiple distinct spoken utterances exchanged during a conversation between multiple participants, without requiring explicit invocation of the automated assistant prior to each of the multiple distinct spoken utterances;
   automatically perform, by the automated assistant, semantic processing on first text generated from the speech-to-text processing of a first spoken utterance of the multiple distinct spoken utterances, wherein the semantic processing is performed without explicit participant invocation;
   generate, by the automated assistant, based on the semantic processing, a first query;
   obtain first information that is responsive to the first query;
   monitor, by the automated assistant, the conversation for a pause of at least a first predetermined time interval;
   in response to detection of the pause of at least the first predetermined time interval in the conversation, provide audible output that conveys at least part of the first information that is responsive to the first query to the multiple participants at one or more of the conference computing devices while the automated assistant is in conference mode;
   in response to a determination that a second predetermined time interval since the first spoken utterance that was used to generate the first query has passed without the pause being detected, determine that a relevancy score of the first information fails to satisfy a minimum relevancy threshold; and provide output that conveys second information that is responsive to a second query generated based on a second spoken utterance that occurred subsequent to the first spoken utterance, wherein the second predetermined time interval is greater than the first predetermined time interval.

4. The system of claim 3, further comprising instructions to, in response to the determination that the second predetermined time interval has passed without the pause being detected, output the first information after a conclusion of the conversation.

* * * * *